United States Patent [19]

Turner

[11] Patent Number: 4,759,425
[45] Date of Patent: Jul. 26, 1988

[54] SLING SEAT

[76] Inventor: Scott A. Turner, 5339 Beaver Dam Rd., West Bend, Wis. 53095

[21] Appl. No.: 83,192

[22] Filed: Aug. 10, 1987

[51] Int. Cl.⁴ .............................................. A45F 3/26
[52] U.S. Cl. .................................... 182/187; 297/217
[58] Field of Search ...................... 182/187, 188, 136; 297/217

[56] References Cited

U.S. PATENT DOCUMENTS

| | | | |
|---|---|---|---|
| 2,821,335 | 1/1958 | White | 297/217 |
| 2,847,059 | 8/1958 | Klins | 182/188 |
| 4,315,655 | 2/1982 | Machnik | 182/187 |
| 4,397,500 | 8/1983 | Moffitt | 182/187 |
| 4,445,591 | 5/1984 | Mitchell | 182/187 |
| 4,553,635 | 11/1985 | Johnson | 182/187 |

FOREIGN PATENT DOCUMENTS 376546  12/1970  U.S.S.R. .................................. 182/7

Primary Examiner—Reinaldo P. Machado
Attorney, Agent, or Firm—Donald Cayen

[57] ABSTRACT

A sling seat is useful for enabling hunters to sit comfortably in trees. The sling seat comprises a tough flexible seat member having pairs of aligned and spaced slits therethrough. A long flexible strap passes through each pair of slits such that the strap underlies the seat member. The strap ends are buckled to any convenient tree limb for supporting the seat member in practically any desired location within the tree.

3 Claims, 1 Drawing Sheet

SLING SEAT

BACKGROUND OF THE INVENTION

1. Field of the Invention

This invention pertains to seating, and more particularly to apparatus for enabling persons to sit comfortably in trees.

2. Description of the Prior Art

Various equipment has been developed to assist hunters and other outdoorsmen sit at selected locations in the field. Such equipment includes portable seating that is designed to be supported by tree limbs.

U.S. Pat. No. 4,445,591 shows an example of a tree stand that includes a rigid seat member. The rigid seat makes the tree stand awkward and inconvenient to carry, both on the ground and up a tree. Further, the rigid seat limits the number of locations that are suitable for supporting the tree stand in a tree.

U.S. Pat. No. 4,315,655 shows a seat that has a single cord extending from each end of the seat portion. The device is designed to be supported by a vertical tree trunk or pole. To sit on the seat, the hunter must place his feet on the ground and his back against the tree or pole. While satisfactory for resting, the seat of the U.S. Pat. No. 4,315,655 is not suitable for being suspended within the tree branches. Consequently, it is not useful to hunters who prefer watching for game from a high vantage point.

The tree stand of U.S. Pat. No. 4,553,635 includes a pair of rigid structural elements that hamper compact folding and convenient portability. Further, the net-type construction with numerous knots is undesirably tedious to make or expensive to purchase.

Thus, a need exists for versatile and convenient outdoor seating.

SUMMARY OF THE INVENTION

In accordance with the present invention, an inexpensive and portable sling seat is provided that is universally adaptable for use within tree limbs. This is accomplished by apparatus that includes a flexible and comfortable seat member in cooperation with stable suspension devices.

The seat member is made of a strong but pliable material. It is preferably rectangular in shape and of a size sufficient for comfortable sitting. To stably suspend the seat member from tree limbs or other supports, a pair of flexible straps are captured within slits in the seat member. The slits extend transversely to the seat member long dimension and are located near each of the four seat member corners. Each strap passes under the seat member along a longitudinal edge and upwardly through two aligned slits on opposite ends of the seat member. Buckles are attached to one end of each strap.

The buckles and long straps emanating from the seat member provide great versatility for the sling seat. The four strap ends can be looped around almost any combination of tree limbs in a manner that permits a hunter to sit comfortably and face almost any direction. The flexible nature of the components render the sling seat collapsible into a small package or wrapable around the hunter's body for easy carrying up a tree.

Other advantages and features of the invention will become apparent to those skilled in the art upon reading the detailed description of the invention.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended thereto.

Figure 1:
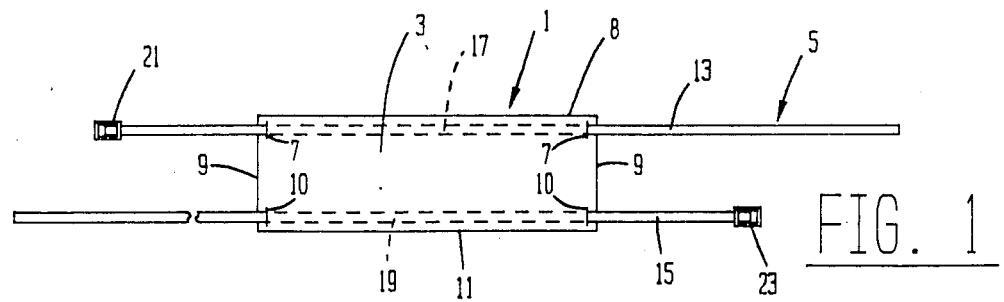
FIG. 1 is a top view of the sling seat of the present invention.
Figure 2:
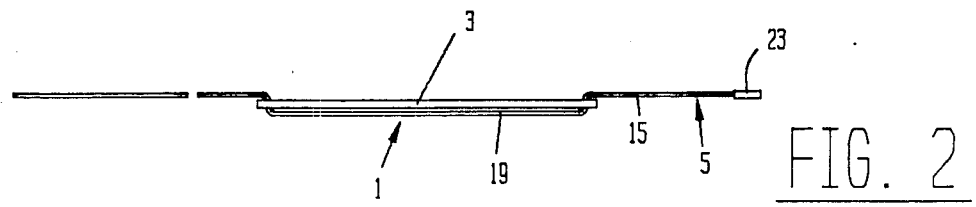
FIG. 2 is a side view of the sling seat of the present invention.
Figure 3:
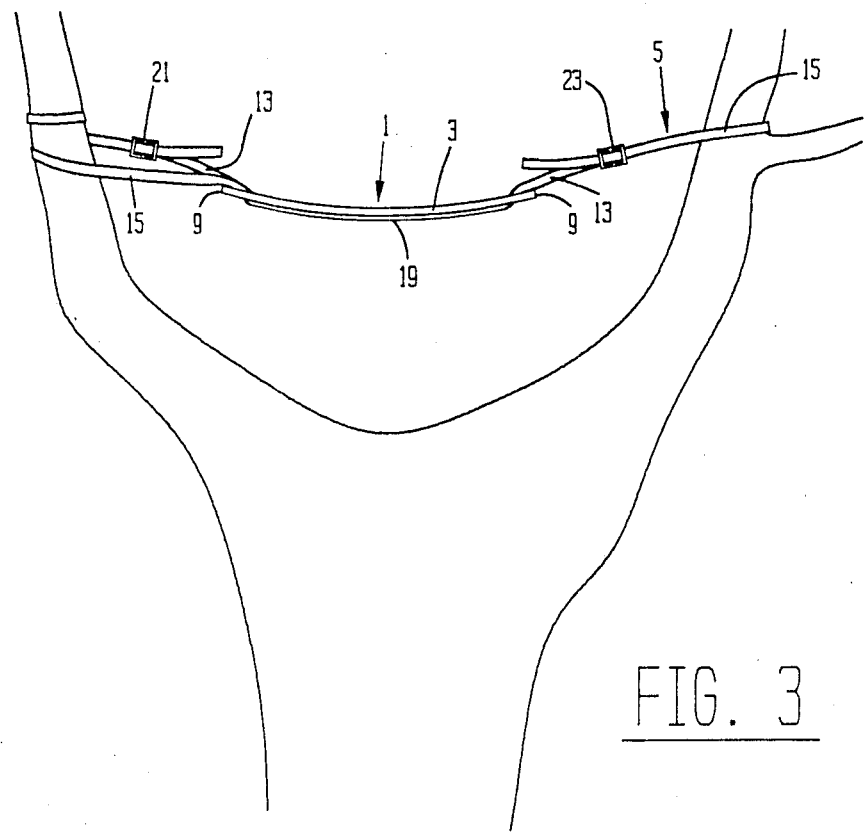
FIG. 3 is a perspective view of the sling seat suspended from the limbs of a tree.

Referring to FIGS. 1–3, a sling seat 1 is illustrated that includes the present invention. The sling seat is particularly useful to deer hunters who watch for game from trees, but it will be understood that the invention is not limited to hunting applications.

The sling seat 1 comprises a seat member 3 and a set of suspension straps 5. The seat member 3 may be made of any suitable tough but pliable material. A preferred material is a reinforced composite synthetic material, such as conveyor belting. Although the seat member may be made of any suitable size and shape, I have found that a rectangular shape approximately 18 inches long and 6 inches wide works very well.

Near each of the four corners of the seat member 3 is a slit that extends through the thickness of the seat member material. One pair of slits 7 are cut adjacent the seat member first longitudinal edge 8. The second pair of slits 10 lie adjacent the seat member second longitudinal edge 11. Each slit 7, 10 is parallel to the seat ends 9.

To support the sling seat 1 within a tree, the suspension straps 5 include a pair of elongated flexible straps 13, 15. The strap 13 passes through the slits 7, such that the strap center portion 17 underlies the seat member adjacent the longitudinal edge 8. Similarly, the center portion 19 of the strap 15 underlies the seat member adjacent longitudinal edge 11. For convenience to the hunter or other person using the sling seat, one end of each strap is provided with a buckle 21, 23. The sling seat should be drawn as tightly as possible between the tree limbs, although for clarity the straps are shown slightly loose in FIG. 3.

The 18 inches by 6 inches size of the seat member mentioned previously is comfortable to sit on and provides stability, because the straps underlie the seat member along the edges 8 and 11. The flexibility of the suspension straps 5 enable the sling seat to be suspended tightly between almost any configuration of tree limbs. Consequently, the hunter can arrange the seat such that he has a 360 degree field of view of the surrounding area. A double wrap of a strap 13, 15 around a rough barked limb is self tightening to safely hold a seat to the tree. The buckles 21, 23 are used to tie the strap ends around small limbs. If desired, one end 9 of the seat member may be placed directly against a vertical tree limb such that the user can sit with his back against the limb and his legs straddling the seat edges 8 and 11. The sling seat 1 is comprised exclusively of flexible and lightweight parts. In that manner, the sling seat can be easily rolled or folded into a jacket pocket or a back sack for convenient portability. However, the most convenient carrying method is merely to tie the sling seat around the waist and wear it like a belt.

Thus, it is apparent that there has been provided, in accordance with the invention, a sling seat that fully satisfies the aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:
1. A sling seat comprising:
   a. a seat member fabricated of a single piece of tough pliable material free of rigid components and having top and bottom surfaces and defining at least two pairs of space narrow rectangular slits therethrough; and
   b. at least two flexible elongated straps terminating remote from the seat member and having respective opposed free ends, each strap passing through one pair of slits and being frictionally retained therein with the strap passing along the seat member bottom surface between the slits,
   so that the sling seat may be suspended by the free ends of the straps from horizontally spaced supports to enable a person to stably sit on the seat member.
2. The sling seat of claim 1 wherein:
   a. the seat member is of a generally rectangular shape having longitudinal edges; and
   b. the rectangular slits are formed in each corner of the seat member with the major dimension thereof generally perpendicular to the seat member longitudinal edges,
   so that the straps are positively guided to run adjacent the longitudinal edges of the seat member.
3. The sling seat of claim 2 wherein the seat member is approximately 18 inches long and 6 inches wide,
   so that the lateral spacing between the straps provides lateral stability to the sling seat.

* * * * *